United States Patent Office 3,017,343
Patented Jan. 16, 1962

3,017,343
PREVENTING HEAT EXCHANGE DEPOSITS
Ernest L. Pollitzer, Hinsdale, Ill., assignor, by mesne assignments, to Universal Oil Products Company, Des Plaines, Ill., a corporation of Delaware
No Drawing. Filed Apr. 28, 1958, Ser. No. 731,131
7 Claims. (Cl. 208—47)

This invention relates to a novel method of preventing heat exchanger deposits.

In many refining processes, the charge to the process is heated to an elevated temperature for subjecting to the desired conversion, and the heated effluent products from such conversion are cooled for subsequent separation into the desired fractions. At least a portion of the heating of the charge is economically obtained by heat exchange with hot products from within the process. Furthermore, at least a portion of the cooling of the hot effluent products likewise is economically obtained by heat exchange with the charge to the process. These economies also are obtainable in systems in which a charge is heated and then subjected to distillation or fractionation in order to separate the charge into different fractions. In such distillation or fractionation systems, the lower portion of the distillation or fractionation zone is heated in order to vaporize and remove the lighter components as overhead and/or side streams. The bottoms from the distillation or fractionation zone are withdrawn and generally are cooled before being sent to storage or subsequent treatment and, here again, economies are effected by transferring at least a portion of the heat from the hot bottoms product to the charge. While the present invention is particularly useful in systems in which the charge to the process is passed in heat exchange with hot effluent products of the process, it is understood that the present invention also may be used in any heat exchange system in which undesirable deposit formation is encountered.

During such heat exchange, deposit formation occurs in the tubes and/or the shell of the heat exchanger, with the result that satisfactory heat exchange does not take place and eventually the tubes and/or exchanger shell become plugged. It then is necessary to shut down the plant in order to clean out the heat exchanger and, if necessary, to replace all or portions of the heat exchange equipment. This, of course, adds to the expense, both in manpower to clean and/or replace the heat exchange equipment and also in the cost of the additional equipment. Furthermore, this condition is aggravated by the fact that the unit itself must be shut down to make the changes to the heat exchange equipment. It is apparent that the necessity to shut down the plant is of great expense because of the loss of products to be marketed. These serious objections are avoided by the novel process of the present invention.

An example of a process in which the charge is passed in heat exchange with hot effluent products is a hydrotreating process in which oil is subjected to hydrogen treating in the presence of a catalyst comprising alumina-molybdenum oxide-cobalt oxide or alumina-molybdenum sulfide-cobalt sulfide. The oil may comprise gasoline, kerosene, gas oil or mixtures thereof and is treated to remove impurities including sulfur compounds, nitrogen compounds, oxygen compounds, metals, etc. The treating is effected at a temperature within the range of from about 500° to about 800° F. or more at hydrogen pressures of from about 100 to about 1000 pounds per square inch or more. The oil charged to the process generally is introduced at a temperature of from ambient to 200° F. and is passed in heat exchange with products withdrawn from the reactor at a temperature of from about 500° to about 800° F. During this heat exchange the charge is heated to a temperature of from about 300° to about 600° F. and then may be heated further in a furnace or otherwise to the temperature desired for effecting the treating. At the same time the hot reactor effluent products are cooled to a temperature of from about 300° to about 600° F. but below that at which they are withdrawn from the reactor. Generally the partly cooled reactor effluent products are cooled further by heat exchange with water or otherwise and then are passed into a separator, wherefrom gases and liquids are each separately withdrawn. Another illustrative example of a process in which the charge is passed in heat exchange with reactor effluent products is a reforming process in which gasoline is contacted with hydrogen in the presence of a platinum-containing catalyst at a temperature of from about 700° to about 1000° F.

An example in which oil is subjected to fractionation and the charge is passed in heat exchange with the hot effluent products is in a crude column. In this column, crude oil is subjected to distillation at a temperature of from about 600° to about 700° F. in order to remove lighter components as overhead and/or side streams. In some cases the charge first is passed in heat exchange with the overhead and/or side streams from this column and then is passed in heat exchange with the hotter products withdrawn from the bottoms of the crude column. In this way the charge is progressively heated and the hotter products are cooled.

The above examples are illustrative of typical uses of heat exchange to effect economies in the process. However, difficulty is experienced in the heat exchange due to deposit formation, with the consequent necessity of interrupting plant operation as hereinbefore set forth. In accordance with the present invention, deposit formation in heat exchangers is reduced to an extent that normal plant operation need not be interrupted for this reason.

It is understood that the advantages of the present invention may be obtained in any suitable heat exchange equipment. In general, this equipment comprises a series of tubes or a tube coil positioned within a shell. One of the fluids is passed through the tubes, while the other fluid is passed through the shell. The heat exchange equipment generally is positioned externally to a fractionator or reactor. However, in some cases, the heat exchanger takes the form of a reboiler or condenser, and either a tube coil or a shell containing tubes is positioned within the lower or upper portion of the fractionator or reactor.

In one embodiment the present invention relates to a method of preventing deposit formation in a heat exchanger through which two fluids at different temperatures are passed, which comprises incorporating in at least one of said fluids from about 1 to about 1000 parts per million by weight of the reaction product of an amino compound having at least 12 carbon atoms with an epihalohydrin compound.

In a specific embodiment the present invention relates to a method of preventing deposit formations in a heat exchanger through which at least a portion of a hydrocarbon charge to the process is passed in heat exchange with at least a portion of hot reactor effluent products, which comprises incorporating in said charge from about 5 to about 100 parts per million by weight of the reaction product of tallow amine with epichlorohydrin.

In accordance with the present invention, deposit formation in heat exchangers is prevented by incorporating in one or both of the fluids passing through such heat exchange the reaction product of an amine compound, having at least 12 carbon atoms with an epihalohydrin compound. It is essential in the present invention that the amine compound used in preparing the reaction product contains at least 12 carbon atoms and preferably at least 15 carbon atoms. Generally the total number of carbon atoms in the amine will not exceed about 40 carbon atoms per molecule. In a preferred embodiment the amine contains a straight chain of at least 3 carbon atoms attached to the nitrogen atom. In this preferred embodiment, the alkyl group attached to the nitrogen atom is of normal configuration and not secondary, tertiary or of cyclic configuration. However, the alkyl group may contain branching in the chain provided such branching occurs on the fourth carbon atom from the nitrogen atom or further distant therefrom.

Any suitable alkyl amine meeting the requirements set forth herein may be used in preparing the additive of the present invention. In addition to the above requirements, it is essential that the alkyl amine is a primary or secondary amine, that is, only one or two of the hydrogen atoms attached to the nitrogen atom are substituted by alkyl groups. Tertiary amines (no hydrogen atoms attached to the nitrogen atom) cannot be used in the present invention. It is understood that the term "alkyl amine" is used in the present specifications and claims to include primary alkyl amines, secondary alkyl amines, polyamines, N-alkyl polyamines, N,N'-dialkyl polyamines, etc., all of which meet the requirements hereinbefore set forth.

Illustrative examples of primary alkyl amines include dodecyl amine, tridecyl amine, tetradecyl amine, pentadecyl amine, hexadecyl amine, heptadecyl amine, octadecyl amine, nonadecyl amine, eicosyl amine, heneicosyl amine, docosyl amine, tricosyl amine, tetracosyl amine, pentacosyl amine, hexacosyl amine, heptacosyl amine, octacosyl amine, nonacosyl amine, triacontyl amine, hentriacontyl amine, dotriacontyl amine, tritriacontyl amine, tetratriacontyl amine, pentatriacontyl amine, hexatriacontyl amine, heptatriacontyl amine, octatriacontyl amine, nonatriacontyl amine, tetracontyl amine, etc. Conveniently the long chain amines are prepared from fatty acids or more particularly mixtures of fatty acids formed as products or by-products. Such mixtures are available commercially, generally at lower prices and, as another advantage of the present invention, the mixtures may be used without the necessity of separating individual amines in pure state.

An example of such a mixture is hydrogenated tallow amine which is available under various trade names including "Alamine H26D" and "Armeen HTD." These products comprise mixtures predominating in alkyl amines containing 16 to 18 carbon atoms per alkyl group, although they contain a small amount of alkyl groups having 14 carbon atoms, and also meet the other requirements hereinbefore set forth.

Illustrative examples of secondary amines include di-(dodecyl) amine, di-(tridecyl) amine, di-(tetradecyl) amine, di-(pentadecyl) amine, di-(hexadecyl) amine, di-(heptadecyl) amine, di-(octadecyl) amine, di-(nonadecyl) amine, di-(eicosyl) amine, etc. In these examples each of the alkyl substituents contains a straight chain of at least 3 carbon atoms attached to the nitrogen atom. In another embodiment, which is not necessarily equivalent, the secondary amine will contain one alkyl group having at least 12 carbon atoms and another alkyl group having less than 12 carbon atoms, both of the alkyl groups having a straight chain of at least 3 carbon atoms attached to the nitrogen atom. Illustrative examples of such compounds include N-propyl-dodecyl amine, N-butyl-dodecyl amine, N-amyl-dodecyl amine, N-butyl-tridecyl amine, N-amyl-tridecyl amine, etc., N-propyl-tetradecyl amine, N-butyl-tetradecyl amine, N-amyl-tetradecyl amine, etc. Here again, mixtures of secondary amines are available commercially, usually at a lower price, and such mixtures may be used in accordance with the present invention, provided that the amines meet the requirements hereinbefore set forth. An example of such a mixture available commercially is "Armeen 2HT" which consists primarily of dioctadecyl amine and dihexadecyl amine.

Preferred examples of N-alkyl polyamines comprise N-alkyl-1,3-diaminopropanes in which the alkyl group contains at least 12 carbon atoms and a straight chain of at least 3 carbon atoms attached to the nitrogen atom. Illustrative examples include N-dodecyl-1,3-diaminopropane,
N-tridecyl-1,3-diaminopropane,
N-tetradecyl-1,3-diaminopropane,
N-pentadecyl-1,3-diaminopropane,
N-hexadecyl-1,3-diaminopropane,
N-heptadecyl-1,3-diaminopropane,
N-octadecyl-1,3-diaminopropane,
N-nonadecyl-1,3-diaminopropane,
N-eicosyl-1,3-diaminopropane,
N-heneicosyl-1,3-diaminopropane,
N-docosyl-1,3-diaminopropane,
N-tricosyl-1,3-diaminopropane,
N-tetracosyl-1,3-diaminopropane,
N-pentacosyl-1,3-diaminopropane,
N-hexacosyl-1,3-diaminopropane,
N-heptacosyl-1,3-diaminopropane,
N-octacosyl-1,3-diaminopropane,
N-nonacosyl-1,3-diaminopropane,
N-triacontyl-1,3-diaminopropane,
N-hentriacontyl-1,3-diaminopropane,
N-dotriacontyl-1,3-diaminopropane,
N-tritriacontyl-1,3-diaminopropane,
N-tetratriacontyl-1,3-diaminopropane,
N-pentatriacontyl-1,3-diaminopropane,
N-hexatriacontyl-1,3-diaminopropane,
N-heptatriacontyl-1,3-diaminopropane,
N-octatriacontyl-1,3-diaminopropane,
N-nonatriacontyl-1,3-diaminopropane,
N-tetracontyl-1,3-diaminopropane, etc.

As before, mixtures are available commercially, usually at lower prices, of suitable compounds in this class and advantageously are used for the purposes of the present invention. One such mixture is "Duomeen T" which is N-tallow-1,3-diaminopropane and predominates in alkyl groups containing from 16 to 18 carbon atoms each, although the mixture contains a small amount of alkyl groups containing 14 carbon atoms each. Another mixture available commercially is N-coco-1,3-diaminopropane which contains alkyl groups predominating in 12 to 14 carbon atoms each. Still another example is N-soya-1,3-diaminopropane which predominates in alkyl groups containing 18 carbon atoms per group, although it contains a small amount of alkyl groups having 16 carbon atoms.

While the N-alkyl-1,3-diaminopropanes are preferred compounds of this class, it is understood that suitable N-alkyl ethylene diamines, N-alkyl-1,3-diaminobutanes, N-alkyl-1,4-diaminobutanes, N-alkyl-1,3-diaminopentanes, N-alkyl-1,4-diaminopentanes, N-alkyl-1,5-diaminopentanes, N-alkyl-1,3-diaminohexanes, N-alkyl-1,4-diaminohexanes, N-alkyl-1,5-diaminohexanes, N-alkyl-1,6-diaminohexanes, etc. may be employed, but not necessarily with equivalent results. Also, it is understood that polyamines containing 3 or more nitrogen atoms may be employed provided they meet the requirements hereinbefore set forth. Illustrative examples of such compounds include N-dodecydiethylene triamine, N-tridecyl-diethylene triamine, N-tetradecyl-diethylene triamine, etc., N-dodecyl-dipropylene triamine, N-tridecyl-dipropylene triamine, N-tetradecyl-dipropylene triamine, etc., N-dodecyl-dibutylene triamine, N-tridecyl-dibutylene triamine, N-tetradecyl-dibutylene triamine, etc., N-dodecyl-triethylene tetramine, N-tridecyl-triethylene tetramine, N-tetradecyl-triethylene tetramine, etc., N-dodecyl-tripropylene tetramine, N-tridecyl-tripropylene tetramine, N-tetradecyl-tripropylene tetramine, etc., N-dodecyl-tributylene tetramine, N-tridecyl-tributylene tetramine, N-tetradecyl-tributylene tetramine, etc., N-dodecyl-tetraethylene pentamine, N-tridecyl-tetraethylene pentamine, N-tetradecyl-tetraethylene pentamine, etc., N-dodecyl-tetrapropylene pentamine, N-tridecyl-tetrapropylene pentamine, N-tetradecyl-tetrapropylene pentamine, etc., N-dodecyl-tetrabutylene pentamine, N-tridecyl-tetrabutylene pentamine, N-tetradecyl-tetrabutylene pentamine, etc.

In another embodiment, polyaminoalkanes meeting the requirements hereinbefore set forth may be employed but generally such materials are not available commercially and, therefore, generally are not preferred. Illustrative examples of such compounds include 1,12-diaminododecane, 1,13-diaminotridecane, 1,14-diaminotetradecane, etc.

In general, it is preferred that the amine compound is a saturated compound and does not contain double bonds in the chain. However, in some cases, unsaturated compounds may be employed, provided they meet the other requirements hereinbefore set forth, although not necessarily with equivalent results. Such amine compounds may be prepared from unsaturated fatty acids and, therefore, may be available commercially at lower cost. Illustrative examples of such amine compounds include dodecylenic amine, didodecylenic amine, N-dodecylenic ethylene diamine, N-dodecylenic-1,3-diaminopropane, oleic amine, dioleic amine, N-oleic ethylene diamine, N-oleic-1,3-diaminopropane, linoleic amine, dilinoleic amine, N-linoleic ethylene diamine, N-linoleic-1,3-diaminopropane, etc. It is understood that these amine compounds are included in the present specifications and claims by reference to amine or amine compounds.

As hereinbefore set forth, two different amines may be reacted with the epihalohydrin compound. At least one of the amines must meet the qualifications hereinbefore set forth. The other amine may comprise any suitable compound containing primary and/or secondary amino groups. Preferred compounds comprise ethylene diamine, diethylene triamine, triethylene tetramine, tetraethylene pentamine, etc., similar propylene and polypropylene polyamines, butylene and polybutylene polyamines, etc. In still another embodiment, other suitable nitrogen-containing compounds may be used as, for example, urea, monoethanol amine, etc.

As hereinbefore set forth, the amine compound is reacted with an epihalohydrin compound. Epichlorohydrin is preferred. Other epichlorohydrin compounds include 1,2-epi-4-chlorobutane, 2,3-epi-4-chlorobutane, 1,2-epi-5-chloropentane, 2,3-epi-5-chloropentane, etc. In general, the chloro derivatives are preferred, although it is understood that the corresponding bromo and iodo compounds may be employed. In some cases epidihalohydrin compounds may be utilized. It is understood that the different epihalohydrin compounds are not necessarily equivalent in the same or different substrate and that, as hereinbefore set forth, epichlorohydrin is preferred.

In general, 1 or 2 mols of amine compound are reacted with 1 or 2 mols of epihalohydrin compound. It is understood that, in some cases, an excess of amine or of epihalohydrin may be supplied to the reaction zone in order to insure complete reaction, the excess being removed subsequently in any suitable manner. When 2 mols of amine are reacted per mol of epihalohydrin compound, the amine may comprise the same or different amine compound.

In a preferred embodiment of the invention, the reaction of 1 mol of amine compound with 1 mol of epihalohydrin compound proceeds to the formation of polymeric reaction product. In this embodiment of the invention, the reaction is first effected at a temperature within the range hereinafter set forth, with only a portion of the reactants being present in the reaction mixture. After the initial reaction is completed, the remaining reactants are supplied to the reaction mixture and the reaction is completed at a higher temperature but within the same range set forth herein. For example, a portion of the amine may be first reacted with the epihalohydrin and then the remaining portion of the amine is reacted. These polymers may contain from about 3 to about 20 or more recurring units and preferably from about 5 to about 10 recurring units.

The desired quantity of alkyl amine and epihalohydrin compounds may be supplied to the reaction zone and therein reacted, although generally it is preferred to supply one reactant to the reaction zone and then introduce the other reactant stepwise. Thus, usually it is preferred to supply the amine to the reaction zone and to add the epihalohydrin compound step-wise, with stirring. When it is desired to react two different alkyl amines with the epihalohydrin compound, the epihalohydrin compound is supplied to the reaction zone. One of the amines is added gradually, and the reaction completed, followed by the addition of the second alkyl amine. Generally, it is preferred to utilize a solvent and, in the preferred embodiment, a solution of the amine in a solvent and a separate solution of the epihalohydrin compound in a solvent are prepared, and these solutions then are commingled in the manner hereinbefore set forth. Any suitable solvent may be employed, a particularly suitable solvent comprising an alcohol including ethanol, propanol, butanol, etc., 2-propanol being particularly desirable.

The reaction is effected at any suitable temperature, which generally will be within the range of from about 20° to about 100° C. and preferably is within the range of from about 50° to about 75° C. A higher temperature range of from about 30° to about 150° C. or more, and preferably of from about 50° to about 100° C., is specified when the reaction is effected at superatmospheric pressure to increase the reaction velocity. Conveniently, this reaction is effected by heating the amine solution in dilute alcohol at refluxing conditions, with stirring, gradually adding the epihalohydrin compound thereto, and continuing the heating until the reaction is completed.

Either before or after removal of the reaction product from the reaction zone, the product is treated to remove halogen, generally in the form of an inorganic halide salt as, for example, the hydrogen halide salt. This may be effected in any suitable manner and generally is accomplished by reacting the product with a strong inorganic base such as sodium hydroxide, potassium hydroxide, etc., to form the corresponding metal halide. The reaction to form the metal halide generally is effected under the same conditions as hereinbefore set forth. After this reaction is completed, the metal halide is removed in any suitable manner, including filtering, centrifugal separation, etc. It is understood that the reaction product also is heated sufficiently to remove alcohol and water and this may be effected either before or after the treatment to remove the inorganic halide.

In still another embodiment, after the reaction product of an alkyl amine and epihalohydrin is prepared, the reaction product may be reacted with other nitrogen-containing compounds including, for example, alkanol amines, urea, etc., instead of with the same or different alkyl amine as hereinbefore described. Illustrative alkanol amines include ethanol amine, propanol amine, butanol amine, pentanol amine, hexanol amine, etc.

To prevent heat exchanger deposit formation, the reaction product is added to the fluid in an amount of from about 1 to 1000 parts per million by weight of the fluid and preferably in a concentration of from about 5 to about 100 parts per million. Normally the charge to the treating or conversion process contains components which form deposits in the heat exchangers and, accordingly, the reaction product of the present invention usually is incorporated in the charge prior to entering the heat exchanger. In most cases the charge after heat exchange is subjected to fractionation to separate a particular stream for subjecting to further treating or conversion in the presence of a catalyst. Generally this stream comprises the light or intermediate components of the charge and the heavier components of the charge are removed from the process. In most cases the reaction product will be retained in the bottoms product and therefore will not contact the catalyst used in the subsequent treating or conversion steps. However, it is not believed that the reaction product in the small concentrations used will adversely affect most catalysts, and therefore would be of concern only with processes using catalysts of extreme sensitivity. As stated above, even with such catalysts, the prefractionation will serve to retain the reaction product in the heavier products and will not contact the catalyst.

The novel features of the present invention are particularly applicable to processes in which hydrocarbons are subjected to such heat exchange. These hydrocarbons may be gaseous including, for example, ethane, ethene, propane, propene, butane and/or butene, or they may be liquid including gasoline, naphtha, pentane, hexane, heptane and/or octane fractions, jet fuel, kerosene, diesel fuel, fuel oil, gas oil, etc. As hereinbefore set forth, these hydrocarbons may be subjected to fractionation alone or fractionation followed by treating and/or conversion processes. In some cases, the charge after such heat exchange is sent through heating tubes in a furnace and then into a reaction zone. The novel features of the present invention also may be used to prevent deposit formation in such heating tubes. Generally, the product from the conversion process will be free from components which cause deposit formation and, in such cases, it is unnecessary to also incorporate the reaction product of the present invention in the reactor effluent. However, where the reactor effluent contains such undesirable components, it is also within the scope of the present invention to incorporate the reaction product into the reactor effluent prior to heat exchange. In the latter embodiment it may be desirable to utilize a higher concentration of the reaction product so that the reaction product also serves to impart further stability to the reactor effluent during the subsequent handling, treating and/or storage. In this application the reaction product may be used in a concentration of from about 0.01% to about 0.5% by weight of the substrate.

While the present invention is particularly applicable to the treatment of hydrocarbon fluids, it is understood that it may be employed with other organic fluids which cause deposit formation in heat exchangers. Such other organic fluids include alcohols, aldehydes, ketones, detergents, pharmaceuticals, organic intermediates, etc.

The following examples are introduced to illustrate further the novelty and utility of the present invention but not with the intention of unduly limiting the same.

*Example I*

The reaction product of this example was prepared by the reaction of equal mol proportions of hydrogenated tallow amine (Armeen HTD) and epichlorohydrin. It will be noted that the tallow amine is a mixture of primary amines predominating in 16 to 18 carbon atoms per alkyl group. The reaction was effected by first forming a solution of 2 mols of epichlorohydrin in 600 cc. of a solvent mixture comprising 400 cc. of xylene and 200 cc. of 2-propanol. A separate solution of 2 mols of Armeen HTD was prepared in an equal volume of xylene. One mol of the latter solution was added gradually to the epichlorohydrin solution, with stirring and heating at 55°–60° C. for a period of 2.5 hours. Then another mol of Armeen HTD was added gradually to the reaction mixture, stirred and reacted at 80° C. for 2.5 hours. One mol of sodium hydroxide then was added with stirring and heating at 85°–90° C. for 3.5 hours, after which another mol of sodium hydroxide was added and the mixture stirred and reacted at 85°–90° C. for one hour. Following completion of the reaction, the mixture was cooled, filtered, and the filtrate then was distilled to remove the alcohol. In this case, the xylene solvent was allowed to remain in the final product as it was intended to use the reaction product as a 50% solution of active ingredient.

However, for analytical purposes, a portion of the above solution was distilled at 0.1 mm. of vacuum to remove the xylene and to recover a substantially pure reaction product. This product is a white to off-white hard, brittle solid, and has a softening point of about 43° C. and melts at 51° C. to a dark yellow liquid, which liquid is soluble in all common hydrocarbons and other organic solvents. This product has equivalent weight by basic nitrogen titration of 334.

The number of polymer molecules may be determined by analyzing for secondary nitrogen groups which are the end groups. By determining the number of secondary nitrogen end groups, the size of the molecule can be calculated. Such an analysis of the preparation described above calculates to a total of 12 recurring units and represents a molecular weight of about 6600.

*Example II*

The reaction product prepared in the above manner was evaluated according to the C.F.R. fuel coker thermal stability test. In this test, the oil heated to the specified temperature is passed through the annular space surrounding a heated inside tube of 17″ length and ½″ diameter positioned within an outside tube of 9/16″ inside diameter. The inside tube is heated by means of a heating coil positioned therein to a temperature of either 300° or 400° F. depending upon the particular fuel being evaluated. The test is conducted for 300 minutes, at a pressure of 160 pounds per square inch, and a flow rate of 6 pounds of fuel per hour. Following the run the equipment is dismantled, 13″ or less of the inner tube is marked off in 1″ increments and the deposits on the heated inner tube are rated by visual comparison with standard metal coupons. In general the rating is substantially as follows:

| | |
|---|---|
| Clean and bright | 0 |
| Metal dulled but not discolored | 1 |
| Light yellow discoloration | 2 |
| Yellow to tan discoloration | 3 |
| Anything darker or heavier than 3 | 4 |

The ratings for the individual 1″ increments are added together to give a final tube rating. Military specifications for jet fuels require that none of the 1″ increments rate poorer than 3.

The fuel evaluated in this example is a J.P.–6 commercial fuel and was tested at 400° F. A sample of the jet fuel evaluated in the above manner had a tube rating of 15. 30 parts per million by weight of the reaction product prepared in the manner described in Example I was incorporated in another sample of this fuel and, when evaluated in the above manner, the tube rating was 6. No 1″ increment rated higher than 2.

It will be noted that the reaction product of the present invention served to considerably reduce deposit formation.

*Example III*

The reaction product prepared in the manner described in Example I was evaluated in a different J.P.–6 commercial jet fuel which, without incorporation of the additive, had a tube rating of 12. 25 parts per million by weight of the reaction product was incorporated in another sample of this jet fuel and, when evaluated in the above manner, the tube deposit rating was 4. Here again it will be noted that the reaction product served to effectively prevent deposit formation.

*Example IV*

The reaction product prepared in the manner described in Example I also was evaluated in a commercial Unifining unit. In this unit a mixture of gasoline and kerosene was subjected to hydrotreating in the presence of an alumina-molybdenum oxide-cobalt oxide catalyst. The charge was introduced at a temperature of about 175° F.

and passed in heat exchange with reactor effluent being withdrawn at a temperature of about 650° F. This served to heat the charge to a temperature of about 520° F. and to cool the reactor effluent to a temperature of about 350° F.

In in this unit, the charge passed through the shell of the exchanger and the reactor effluent passed through the tubes. During use, prior to the incorporation of an additive in the charge, a very heavy black deposit filled the space around the tubes in the hotter section of the exchanger, and the exchanger had to be withdrawn from service and cleaned approximately every 2–3 months. However, upon the addition to the charge of about 6 parts per million of the reaction product prepared in the manner described in Example I, no serious fouling problem was encountered. After three months of such use, the unit was shut down for different reasons and the exchanger was inspected. There was only a thin layer of varnish-like deposit on the tubes throughout the entire exchanger and this very small amount of deposit caused no interference with the satisfactory operation of the heat exchanger. In fact, all through the three month period of use, heat exchange was substantially constant. Accordingly, the heat exchanger could be placed back into service without even any cleaning when the unit again was placed on stream.

*Example V*

The reaction product of this example was prepared by the reaction of 2 mols of hydrogenated tallow amine (Alamine H26D) with 1 mol of epichlorohydrin, the tallow amine being a mixture of primary amines predominating in 16 to 18 carbon atoms per alkyl group. The amine was prepared as a dilute solution in 2-propanol and was supplied to an autoclave and heated to reflux, with stirring. One mol of epichlorohydrin, separately prepared as a solution in 2-propanol, was added gradually to the autoclave and the heating and mixing were continued for about 1.5 hours to insure complete reaction. Thereafter, 1 mol of sodium hydroxide was added to the autoclave, and the heating and stirring were continued. After completion of the reaction, the mixture was filtered hot to remove sodium chloride, and the filtrate then was distilled to remove the alcohol solvent. The reaction product was prepared as a 50% solution in xylene and then is incorporated in a concentration of 40 parts per million in crude oil being subjected to fractionation to separate different fractions for further processing.

*Example VI*

As hereinbefore set forth, effective additives also are obtained by the reaction of epichlorohydrin with both an amine and another amine or other nitrogen-containing compound. In the preparation of the present example, hydrogenated tallow amine was reacted with epichlorohydrin and then the product was further reacted with mono-ethanolamine. One mol of hydrogenated tallow amine was dissolved in 2-propanol and heated with stirring to 60°–65° C. One mol of epichlorohydrin dissolved in 2-propanol was added gradually to the amine solution. After the reaction was completed, the entire solution was removed from the reaction zone and was added gradually to a refluxing solution of 1 mol of mono-ethanolamine. Subsequently, 1 mol of sodium hydroxide was reacted with the mixture and, upon completion of the reaction, the mixture was filtered hot to remove sodium chloride, and the filtrate then was allowed to cool.

The reaction product prepared in the above manner is incorporated in the charge being passed through the tubes of a heat exchanger, in heat exchange with reactor effluent products being passed through the shell of the heat exchanger, and serves to reduce deposit formation in the heat exchanger tubes.

*Example VII*

This reaction product was prepared in substantially the same manner as described in Example VI except that the final reaction is effected using 1 mol of urea. Upon cooling of the filtrate, a precipitate separated out, was filtered, dried to remove adhering solvent and then formed as a 40% active ingredient solution in benzene.

The reaction product is used in a concentration of 70 parts per million by weight as an additive to a naphtha being subjected to hydrotreating. The naphtha containing the reaction product is passed in heat exchange with the reactor effluent, and this serves to reduce deposit formation in the heat exchanger.

*Example VIII*

In this example, 2 mols of a mixture of di-(octadecyl) amine and di-(hexadecyl) amine (Armeen 2HT) was reacted with 1 mol of epichlorohydrin and then the product was reacted with 0.5 mol of ethylene diamine. The reaction was effected in substantially the same manner as described in the previous examples. The reaction product is prepared as a 60% solution in toluene and is incorporated in the charge being passed in heat exchange with reactor effluent. This serves to reduce deposit formation in the heat exchanger.

I claim as my invention:

1. In the conversion of hydrocarbon oils wherein the oil is heated by indirect heat exchange with a heating fluid in a heat exchanger, said oil containing components which form deposits in the heat exchanger at the temperature to which the oil is heated in the exchanger, the method of retarding deposit formation in the heat exchanger which comprises heating the oil in said heat exchanger in admixture with from about 1 to about 1000 parts per million by weight of the reaction product of an aliphatic amine containing from 12 to about 40 carbon atoms per molecule and having from one to two hydrogen atoms attached to the nitrogen atom with an epihalohydrin compound selected from the group consisting of epichlorohydrin, 1,2-epi-4-chlorobutane, 2,3-epi-4-chlorobutane, 1,2-epi-4-chloropentane, 2,3-epi-5-chloropentane and corresponding bromo and iodo compounds, said reaction product having been formed by reacting from 1 to 2 mols of the amine with from 1 to 2 mols of the epihalohydrin compound at a temperature of from about 20° C. to about 150° C., followed by dehalogenation.

2. The method of claim 1 further characterized in that said amine is di-(hexadecyl) amine and said epihalohydrin compound is epichlorohydrin.

3. The method of claim 1 further characterized in that said amine is di-(octadecyl) amine and said epihalohydrin compound is epichlorohydrin.

4. The method of claim 1 further characterized in that said reaction product is the reaction product of 1 mol proportion of hydrogenated tallow amine with 1 mol proportion of epichlorohydrin.

5. In the catalytic reaction of hydrocarbon oil with hydrogen wherein the oil is preheated to a temperature of at least about 300° F. by indirect heat exchange with hot effluent products of said reaction in a heat exchanger, said oil containing components which form deposits in the heat exchanger at said temperature, the method of retarding deposit formation in the heat exchanger which comprises heating the oil to at least about 300° F. in said heat exchanger in admixture with from about 1 to about 1000 parts per million by weight of the reaction product of an alkyl amine containing from 12 to about 40 carbon atoms per molecule and having from one to two hydrogen atoms attached to the nitrogen atom with an epihalohydrin compound selected from the group consisting of epichlorohydrin, 1,2-epi-4-chlorobutane, 2,3-epi-4-chlorobutane, 1,2-epi-5-chloropentane, 2,3-epi-5-chloropentane and corresponding bromo and iodo compounds, said reaction product having been formed by reacting from 1 to 2 mols of the amine with from 1 to 2 mols of the epihalohydrin compound at a temperature of from about 20° C. to about 150° C., followed by dehalogenation.

6. The method of claim 5 further characterized in that said alkyl amine is tallow amine and said epihalohydrin compound is epichlorohydrin.

7. The method of claim 5 further characterized in that said reaction product is the reaction product of 1 mol of hydrogenated tallow amine with 1 mol of epichlorohydrin.

References Cited in the file of this patent

UNITED STATES PATENTS

| | | |
|---|---|---|
| 1,790,042 | Eisleb | Jan. 27, 1931 |
| 1,954,133 | Jacob | Apr. 10, 1934 |
| 2,143,388 | Schlach | Jan. 10, 1939 |
| 2,214,352 | Schoeller et al. | Sept. 10, 1940 |
| 2,348,842 | Paul | May 16, 1944 |
| 2,454,547 | Bock et al. | Nov. 23, 1948 |
| 2,662,097 | Baldwin | Dec. 8, 1953 |
| 2,695,222 | Chenicek et al. | Nov. 23, 1954 |
| 2,724,694 | Troianello | Nov. 22, 1955 |
| 2,759,021 | Gaar et al. | Aug. 14, 1956 |
| 2,908,640 | Dougherty | Oct. 13, 1959 |